Nov. 11, 1930.                H. O. HESS                1,781,228
               LATHE FOR TURNING CRANK SHAFTS
                    Filed July 14, 1927

Inventor
Herman O. Hess
By Blackmore, Spencer & Fluit
Attorneys

Patented Nov. 11, 1930

1,781,228

UNITED STATES PATENT OFFICE

HERMAN O. HESS, OF SAGINAW, MICHIGAN, ASSIGNOR TO GENERAL MOTORS CORPORATION, OF DETROIT, MICHIGAN, A CORPORATION OF DELAWARE

LATHE FOR TURNING CRANK SHAFTS

Application filed July 14, 1927. Serial No. 205,747.

This invention relates to lathes and particularly those used in the truing of bearings and crank pins of multiple-throw crankshafts used on automotive vehicles and is in the nature of an improvement over my application Serial No. 151,958, filed December 1, 1926.

The lathes to which the present invention is applied are of a type which have a split gear for the reception of the crank shaft and which gear is used in rotating the shafts so that the working tools may take the excess metal from the bearing parts. The gear is preferably the driving gear and is split diametrically in order that one half thereof may be raised to permit of the insertion and removal of the crankshaft.

When the one half of the gear is raised the lathe is inoperative but there is a tendency for the raised half to rotate out of its bearing, and there is also the danger that the lathe will be started, which may cause damage to the machine and injury to the workmen, unless means is provided to prevent the rotation and starting. It is accordingly the object of the present invention to provide a means or safety mechanism which will prevent the rotation of the raised gear half, and the starting of the machine when the one half is separated from the other. This means is so arranged that it is brought into play only when the gear halves are separated.

The object of the invention is accomplished by providing on the upper half of the gear a bar which extends across its face and to each end of which there is attached a rod, both of which extend inwardly of the gear and pass through flanges on opposite sides of a steady rest which forms a bearing for and means for holding the gear so that it may be raised. The steady rests are hinged and split to coincide with the gear halves and at the split portion have a projection through which the lower ends of the rods pass. Surrounding each rod and held between a collar rigid therewith and the flanges of the steady rest is a coil spring which when the upper half of the gear is raised will cause the rods to descend and the bar to engage in the teeth of the gear and thereby prevent its rotation. When the hinged gear half is in operative position the lower ends of the rods will strike the stationary half and press the rods upwardly and cause the bar to disengage the teeth of the hinged gear.

To retain the stationary half of the gear in position and prevent its rotation when the gear halves are separated, I provide an opening in the face of one of the halves which permits of the reception of a plunger operated by an arm attached to the hinged steady rest of the upper gear half. As the upper steady rest is raised it will cause the arm to swing on an arc and engage the head of the plunger and force it inwardly so as to engage in the opening in the face of the gear. The plunger is surrounded by a coil spring which tends to urge it outwardly or away from the gear face.

The invention is disclosed on the accompanying drawing in which.

Figure 1:
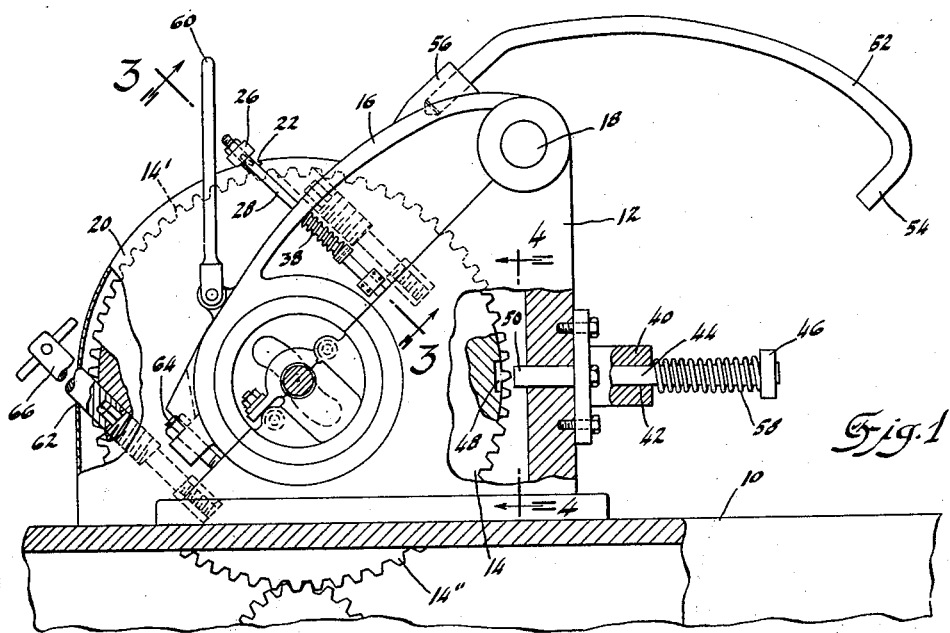
Figure 1 is a sectional view through the lathe on the line 1—1 of Figure 2 showing the split gear and the safety mechanisms.
Figure 2:
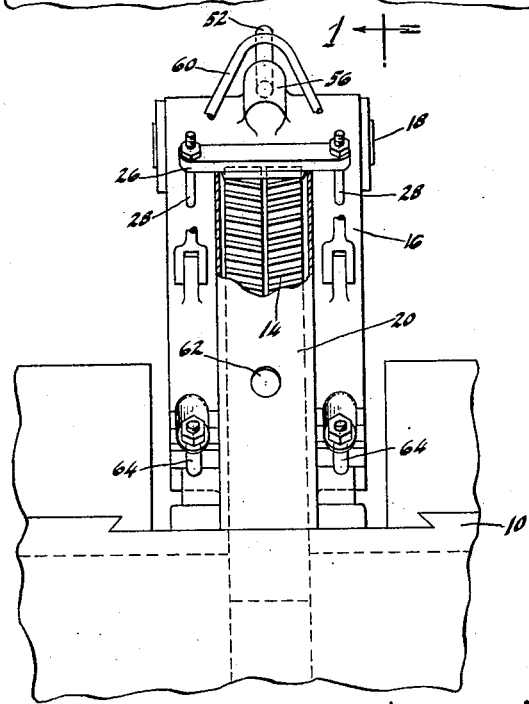
Figure 2 is an elevation view of the structure of Figure 1 looking from the left.

Referring to the numbered parts on the drawing, 10 indicates the bed of the lathe, 12 the frame which supports the driving gear 14, 16 the steady rests which have the portions 17 underlapping the rim of the gear, and 18 the hinge or pivot on which the upper steady rests and gear half swing.

The driving gear 14 has the annular bearing flanges 15 and is provided with a protective housing 20, which has an opening 22 at its upper portion into which there is adapted to pass the rib 24 of the bar 26 which extends entirely across the face of the upper gear half 14'.

Figure 3:
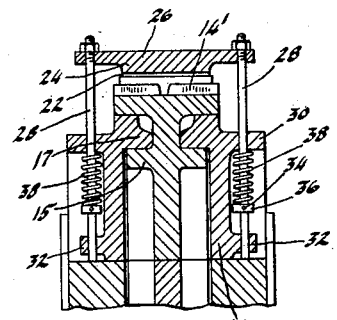
Figure 3 is a detailed sectional view on the line 3—3 of Figure 1.
Figure 4:
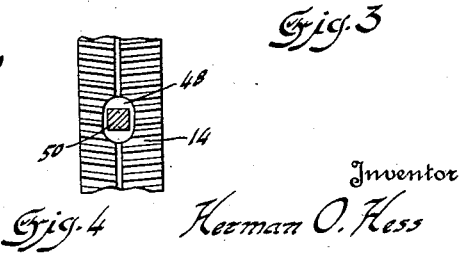
Figure 4 is a detailed sectional view on the line 4—4 of Figure 1.

At each end of the bar 26 there is secured a rod 28 both of which pass through flanges 30 on the steady rests and through projections 32, at the dividing line of the steady rests. Secured to the rod 28 by means of a pin 34 is a collar 36, and between the collar 36 and the flange 30 there is confined a coil spring 38 which constantly tends to urge the rods 28 and bar 26 in a downward direction. As will be seen from Figure 3 the lower ends of the rods 28 are adapted to strike the lower bearing for the half 14" of the split gear when the two gears are in their operative position. This striking of the rods against the lower gear half will push them in an upward direction and cause the bar 26, and its rib 24 to disengage itself from the teeth of the upward gear half 14'.

In order to maintain the lower or stationary gear half in position and prevent it from rotating and the machine from starting while the upper gear half is raised, the following structure is provided. Secured to the rear of the frame 12 is a bracket 40 having a bore or opening 42 for the reception of the plunger 44 having a head 46. The gear half 14" is provided with an opening 48 for the reception of the end 50 of the plunger 44. This opening 48 is so arranged that it will be in alignment with the plunger when the gear halves are in such position that the upper gear may be raised to allow for the removal or insertion of the work. To operate the plunger, I provide a suitably shaped arm 52 having a hook-shaped end 54 and attached as at 56 to the upper or hinged steady rest 16. When the upper steady rest and its gear half 14' are swung upwardly on the hinge 18, the hooked end 54 will engage with the head 46 of the plunger 44 and force it inwardly into the opening 48 against the pressure of the spring 58 which surrounds the plunger and is confined between the head 46 and the bracket 40.

From the description of the two safety devices as above given it will be apparent that the raising of the upper gear half will cause the engagement of the rib 24 of the bar 26 with the teeth of the gear half 14' while the arm 52 will at the same time push the plunger 44 inwardly to cause the engagement of its end 50 in the opening 48 of the lower gear half.

A yoke shown at 60 is shown as attached to the upper half of the steady rests, the purpose of which is to permit the elevation of the gear by means of any suitable mechanism, preferably an electric motor (not shown).

The casing 20 is provided with an opening 62 for the insertion of a suitable tool in order to release the screw which holds the two halves of the gear together during their working operation. Similarly swinging T-bolts 64 are provided to hold the upper or movable half of the steady rests against the lower halves while the gear 14 is being driven. A suitable tool, such as shown at 66, may be used to operate the screw which holds the gear halves together, or the nuts which hold the T-bolts 64.

I claim:

1. In a lathe having a split gear, means for separating one half of the gear from the other, and means for preventing the non-separable gear half from rotating comprising a plunger extending through the frame of the lathe, resilient means tending to urge said plunger away from said non-separable gear half, and an arm attached to said first-named means and adapted to force said plunger into engagement with said nonseparable gear half when said removable half is separated from said stationary half.

2. In a lathe having a split gear, means for separating one gear part from the other part, and a bar operatively related with one gear part and a plunger operatively interrelated with the other gear part to engage the gear parts to prevent rotation thereof when in separated relation.

3. In a lathe having a split gear, means for separating one gear part from the other part, flanges on said means, a member for engaging one part to hold it from movement when separated from the other, means attached to said member and passing through said flanges, and resilient means between said flanges and second named means to urge said member into engagement with said separated gear part.

4. The invention of claim 3, said second named means comprising a plurality of rods at the sides of said first named means.

5. The invention of claim 3, said first named means having an opening to allow for the passage of said member into the toothed portion of said separated gear part.

6. In a lathe having a spilt gear comprising a plurality of hinged halves, means for swinging one half of the gear from the other half, and mechanical means operative incident to and simultaneously with the separation of the halves to engage into the teeth of each gear half to prevent rotation of said gear halves when in separated relation.

7. In a lathe having a split gear, means for separating one half of the gear from the other half, a bar normally inoperative but adapted to engage the toothed surface of the separable gear half for holding it from rotation when separated, and means including a spring to operate said bar.

8. In a lathe having a split gear, means for separating one half of the gear from the other half, a rod on either side of the separable half, a bar attached to said rods and adapted to engage into the teeth of said separable half, and resilient means operatively associated with each rod to operate said bar when the gears are in separated relation.

9. In a lathe having a spilt gear, means for separating one gear half from the other, flanges on said separating means, rods mounted at said flanges, a bar on said rod, and resilient means operatively engaged with said rods to cause said bar to engage the teeth of the separable gear half when in separated position.

10. In a lathe having a split gear, comprising a plurality of hinged halves, means for swinging one half of the gear from the other, means for holding the swingable gear half from rotation when in separated position, said means including an element engaging the teeth of the separable half and said means operative only when the halves are separated.

11. In a lathe having a split gear comprising a pair of hinged halves, means for swinging one gear half away from the other, means including a bar adapted to engage the teeth of the separated half to hold said half from rotation, said means rendered operative on the separation of the halves and rendered inoperative by their rejoining or uniting.

12. In a lathe having a split gear comprising a plurality of sections one of which is swingably hinged, means for swinging said one section on its hinge away from the gear, and means engaging in the toothed surface of a stationary section of the gear to prevent its rotation when the separable section is removed.

13. In a lathe having a split gear comprising a plurality of sections one of which is swingably hinged, means for swinging one section on its hinge away from the gear, and means engaging in an opening in the stationary portion of the gear to prevent its rotation when said hinged section is swung on its hinge.

14. In a lathe having a split gear, means for separating one section of the gear from the other, and a plunger operated by the separation of the gear section and engaging in the stationary gear section for holding it against movement.

15. In a lathe having a split gear, means for separating one section of the gear from the other, a plunger adapted to engage in the stationary gear half to hold it against rotation, a spring urging said plunger to nonengaged position, and means for actuating said plunger upon separation of the gear halves.

16. In a lathe having a split gear, means for separating one section of the gear from the other, a plunger adapted to engage the stationary gear section to hold it against rotation when the gear sections are in separate relation, and means on the separable section adapted to operate the plunger upon separation from the stationary section.

17. In a lathe having a split gear, means for separating one section of the gear from the other, a plunger adapted to engage the stationary gear section to hold it against rotation when the gear sections are in separated relation, and an arm on the separable section adapted to operate the plunger upon separation of the movable section.

18. In a lathe having a split gear comprising a pair of hinged sectors, means for hingedly swinging one gear sector from the other, and mechanical means operative only upon separation of said sectors to engage directly with each sector to prevent rotation of said sectors when in separated position.

19. In a lathe having a split gear comprising a pair of hinged sectors, means for swinging one gear sector from the other, and mechanical means operative only upon separation of said sectors to engage directly with the toothed face of each sector to prevent rotation of said sectors when in separated position.

20. In a lathe having a split gear comprising a pair of hinged sectors, means for hingedly swinging one sector from the other, and mechanical means operative only upon separation of the separable sector to directly engage the separable sector to prevent its rotation.

21. In a lathe having a split gear comprising a pair of hinged sectors, means for hingedly swinging one sector from the other, and mechanical means operated from the swinging means and operative only when said swingable sector is moved to engage with the toothed face of the non-swingable sector to prevent its rotation when the swingable sector is moved therefrom.

22. In a lathe having a split gear comprising a pair of hinged sectors, means for swinging one sector from the other, and mechanical means mounted on said firstnamed means and operative only when said swingable sector is moved and adapted to engage the toothed surface of said swingable sector to prevent its rotation when removed from the stationary sector, said last named means including an element passing through a part of the first named means.

23. In a lathe having a split gear comprising a pair of hinged sectors, means for swinging one sector from the other, and a spring actuated bar mounted on the swinging means and adapted to engage the toothed surface of said swingable sector when moved to prevent its rotation.

24. In a lathe having a gear comprising a plurality of sectors, means for separating one sector from the other, and a bar engaging the separable sector and a plunger engaging the non-separable sector and operative upon separation of said sectors to hold said sectors from rotation.

25. In a lathe having a gear comprising a plurality of sectors, means for separating one sector from the other, a bar adapted to engage the separable sector and a plunger adapted to engage the non-separable sector, and resilient means acting on said bar and plunger to cause them to move in one direction relative to said sectors when said separable sector is moved.

26. In a lathe having a gear comprising a plurality of sectors, means for separating one sector from the other, a bar adapted to engage said separable sector, resilient means acting on said bar to cause it to engage said separable sector when moved to prevent its rotation, a plunger adapted to engage said non-separable sector to prevent its rotation when said separable sector is moved, and resilient means urging said plunger away from said stationary sector.

In testimony whereof I affix my signature.

HERMAN O. HESS.